United States Patent [19]

Wilkins et al.

[11] Patent Number: 5,056,463

[45] Date of Patent: Oct. 15, 1991

[54] AQUARIUM-TERRARIUM APPARATUS

[76] Inventors: James F. Wilkins, 8712 Dayton Oxford Rd. Apt. F; Charles K. Hill, 8712 Dayton Oxford Rd. Apt. J., both of Carlisle, Ohio 45005

[21] Appl. No.: 619,397

[22] Filed: Nov. 29, 1990

[51] Int. Cl.[5] .............................................. A01K 63/00
[52] U.S. Cl. ............................................ 119/5; 47/69
[58] Field of Search ............................ 119/3, 5; 47/69

[56] References Cited

U.S. PATENT DOCUMENTS

| | | | |
|---|---|---|---|
| 919,157 | 4/1909 | Glaser | 119/5 |
| 1,263,391 | 4/1918 | Eickemeyer | 119/5 |
| 2,306,027 | 12/1942 | Swaney | 119/5 |
| 3,903,642 | 9/1975 | Yellin | 47/69 |
| 4,117,805 | 10/1978 | Ward | 119/5 |
| 4,351,270 | 9/1982 | Sabin | 119/5 |
| 4,958,593 | 9/1990 | Hurlbert et al. | 119/5 |

FOREIGN PATENT DOCUMENTS

| | | | |
|---|---|---|---|
| 8100385 | 8/1982 | Netherlands | 47/69 |

*Primary Examiner*—Gene Mancene
*Assistant Examiner*—R. Thomas Price
*Attorney, Agent, or Firm*—Leon Gilden

[57] ABSTRACT

An apparatus including an inverted dome overlying a base member, with the dome in operative communication with fluid and air supply, with the dome including a plant support stand positioned therewithin. A modification of the invention includes a dome with spaced openings to permit aquarium-type fish to be able to access the dome.

3 Claims, 5 Drawing Sheets

AQUARIUM-TERRARIUM APPARATUS

BACKGROUND OF THE INVENTION

1. Field of the Invention

The field of invention relates to aquarium apparatus, and more particularly pertains to a new and improved aquarium-terrarium apparatus wherein the same provides the combination of a terrarium organization supporting plant life in operative association with an aquarium.

2. Description of the Prior Art

Terrarium type devices positioned within an aquatic type setting have been provided in the prior art to maintain terrarium life within an aquarium setting. An example of this structure is found in U.S. Pat. No. 4,754,751 to Richmann wherein a terrarium type plant life is supported in an unenclosed state within an aquarium structure.

U.S. Pat. No. 4,086,876 to Moore, et al. sets forth an aquarium-terrarium structure with a unique cover mounted thereon to provide desired ventilation into the aquarium-terrarium organization.

U.S. Pat. No. 4,351,270 to Sabin sets forth a terrarium-aquarium wherein the organization includes a medially positioned terrarium structure, with separate water filtration system directed therefore.

U.S. Pat. No. 3,804,064 to Kuneman, et al. sets forth an amphibian terrarium organization for use with aquariums, wherein a ramp member permits an amphibious creature such as a turtle to gain access to a terrarium structure overlying an aquarium.

As such, it may be appreciated that there continues to be a need for a new and improved aquarium-terrarium apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of aquarium-terrarium apparatus now present in the prior art, the present invention provides an aquarium-terrarium apparatus wherein the same provides for a self-contained enclosed structure mounted medially of an associated terrarium, including individual air and water components. As such, the general purpose of the present invention, which will be described subsequently in greater detail, is to provide a new and improved aquarium-terrarium apparatus which has all the advantages of the prior art aquarium-terrarium apparatus and none of the disadvantages.

To attain this, the present invention provides an apparatus including an inverted dome overlying a base member, with the dome in operative communication with fluid and air supply, with the dome including a plant support stand positioned therewithin. A modification of the invention includes a dome with spaced openings to permit aquarium-type fish to be able to access the dome.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

Further, the purpose of the foregoing abstract is to enable the U.S. Pat. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved aquarium-terrarium apparatus which has all the advantages of the prior art aquarium-terrarium apparatus and none of the disadvantages.

It is another object of the present invention to provide a new and improved aquarium-terrarium apparatus which may be easily and efficiently manufactured and marketed.

It is a further object of the present invention to provide a new and improved aquarium-terrarium apparatus which is of a durable and reliable construction.

An even further object of the present invention is to provide a new and improved aquarium-terrarium apparatus which is susceptible of a low cost of manufacture with regard to both materials and labor, and which accordingly is then susceptible of low prices of sale to the consuming public, thereby making such aquarium-terrarium apparatus economically available to the buying public.

Still yet another object of the present invention is to provide a new and improved aquarium-terrarium apparatus which provides in the apparatuses and methods of the prior art some of the advantages thereof, while simultaneously overcoming some of the disadvantages normally associated therewith.

Still another object of the present invention is to provide a new and improved aquarium-terrarium apparatus wherein the same provides for a unique plant control structure mounted within the terrarium apparatus.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
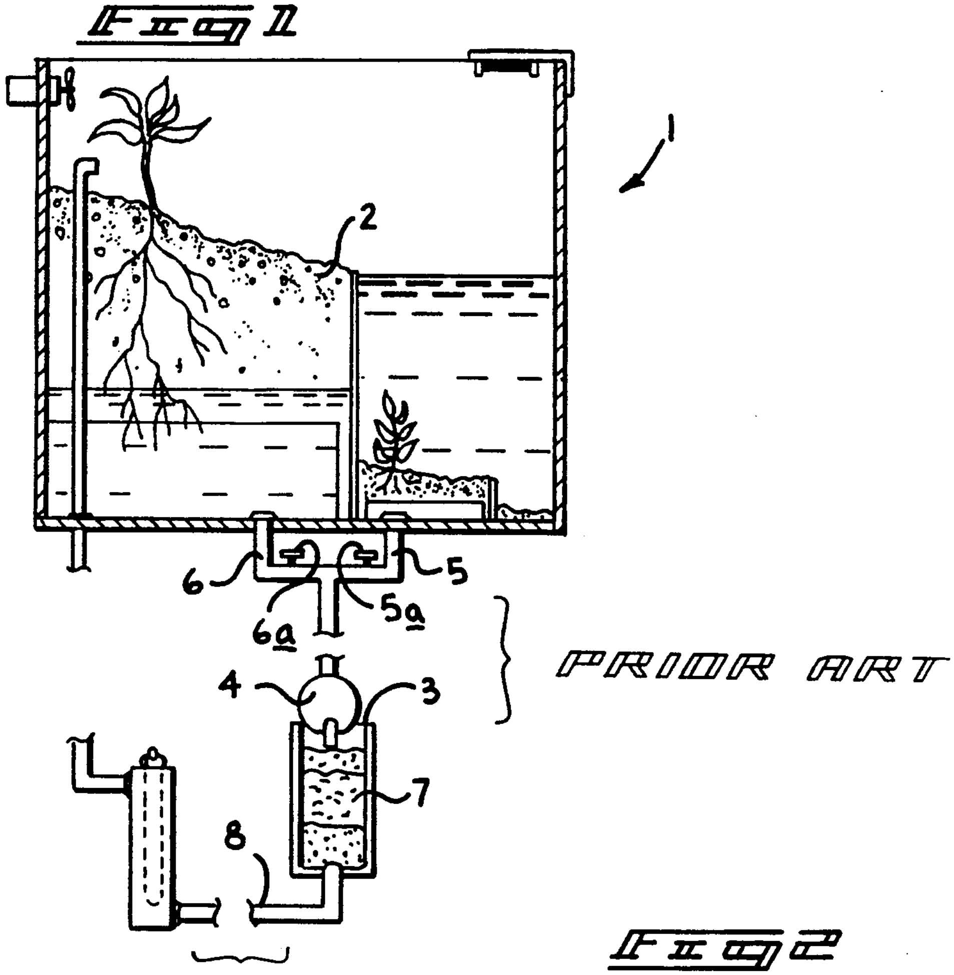
FIG. 1 is an orthographic cross-sectional illustration of a prior art aquarium-terrarium apparatus.
Figure 2:
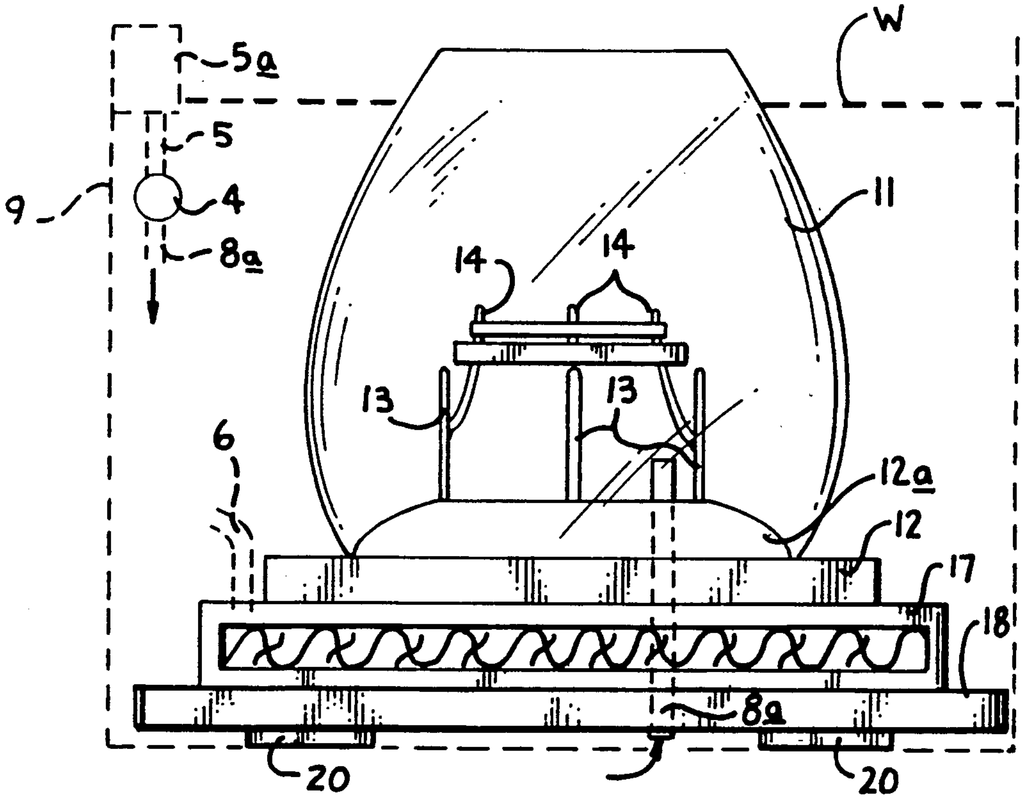
FIG. 2 is an orthographic side view, taken in elevation, of the instant invention.
Figure 3:
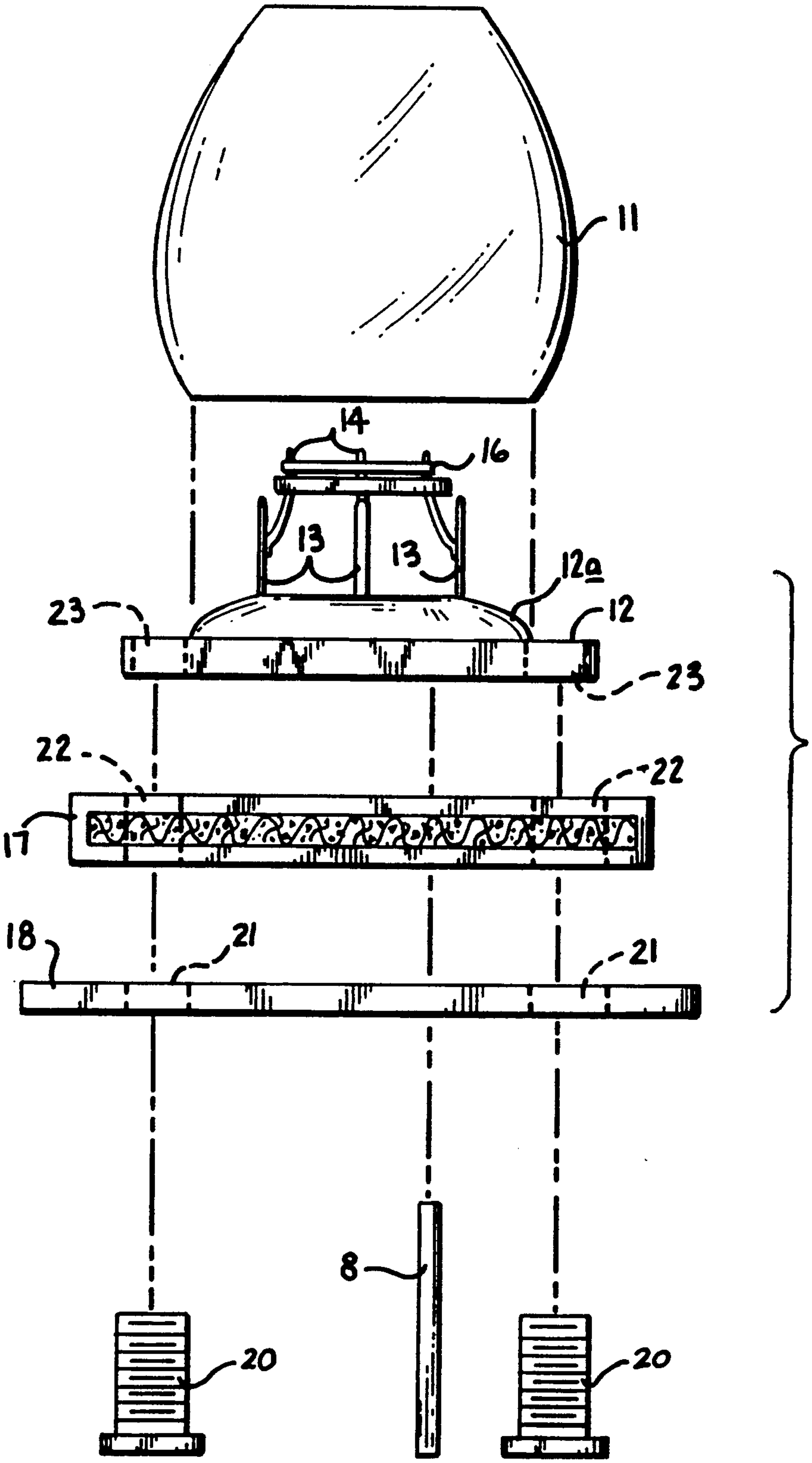
FIG. 3 is an exploded illustration of the instant invention.

With reference now to the drawings, and in particular to FIGS. 1 to 8 thereof, a new and improved aquarium-terrarium apparatus embodying the principles and concepts of the present invention and generally designated by the reference numerals will be described.

FIG. 1 illustrates a prior art aquarium-terrarium apparatus as set forth in U.S. Pat. No. 4,754,571 incorporated herein by reference, wherein the organization 1 includes an aquarium, with a substrate portion 2 in operative association, with a pump assembly that includes a first and second intake 5 and 6 individually valved by separate valves 5*a* and 6*a* respectively. A pump member 4 is operative through a canister 3, including a filter material 7 to direct the filtered water through the output conduit 8*a*.

More specifically, the aquarium-terrarium apparatus of the instant invention essentially comprises an aquarium enclosure 9 containing a predetermined quantity of water "W" therewithin. A fluid impermeable rigid dome 11 is mounted on a dome base 12 that includes an upper arcuate and resilient convex dome base member to form a filter type seal with a lower annular edge of the dome 11. A pump assembly 4 is provided, as of a type as set forth in U.S. Pat. No. 4,754,571, to include an air conduit intake port 5*a* to direct air through a first conduit 5 into a pump 4. A second conduit 6 directs recirculated fluid from and through an associated filter member 17 into the pump 4, in a manner as set forth in FIG. 1 for example. The output conduit 8*a* is in fluid communication with the conduit 8 that directs filtered air into the dome 11. The output conduit 8 utilizes a separate conduit and directs filtered fluid back into the aquarium container 9 below the water level "W". A support base 18 is provided, with threaded securement fasteners 20 (see FIG. 3) that projects through the support base, the filter member 17, and into the dome base 12 to secure the assembly together. It should be noted that any suitable pump assembly may be provided to direct pressurized air into the air conduit 8*a* for use of the organization. Interiorly of the dome 11 a plurality of pot holder legs 13 are fixedly mounted to a top surface of the arcuate convex dome base 12*a*, with each of the vertical pot holder legs 13 including a pot holder branch leg 14 projecting radially and interiorly of the pot holder legs 13 that are arranged in an annular array to define a cylindrical configuration. The branch legs 14 direct radially interiorly as noted and upwardly of the pot holder legs 13 and mount a support leg 14 (see FIG. 4) for mounting a plant pot 19 thereon. Elastomeric bands 16 are provided to bias the branch legs 14 together to constrain and position the plant pot 19 in an axial alignment with the support plate 15. Aquatic plants as desired may be provided within the plant pot 19 for use with the aquarium structure.

Figure 4:
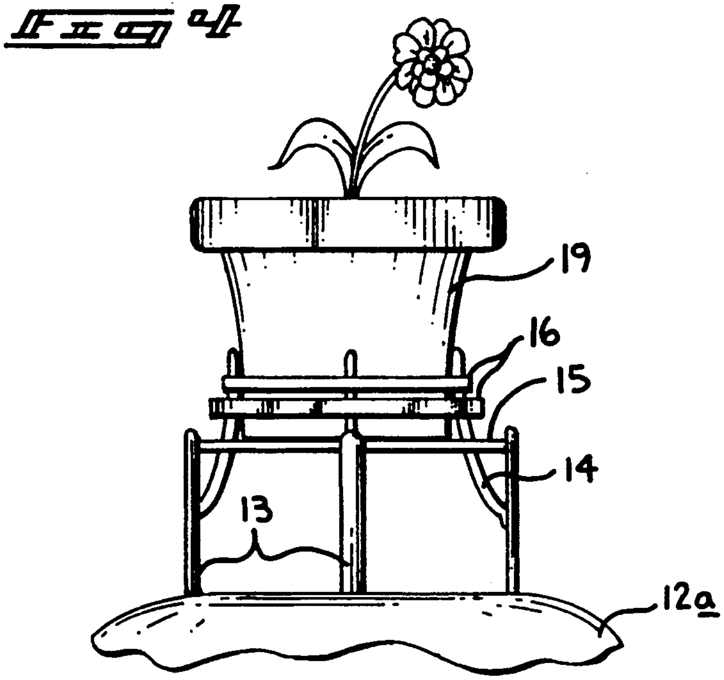
FIG. 4 is an orthographic side view of the plant holder structure utilized by the instant invention.
Figure 5:
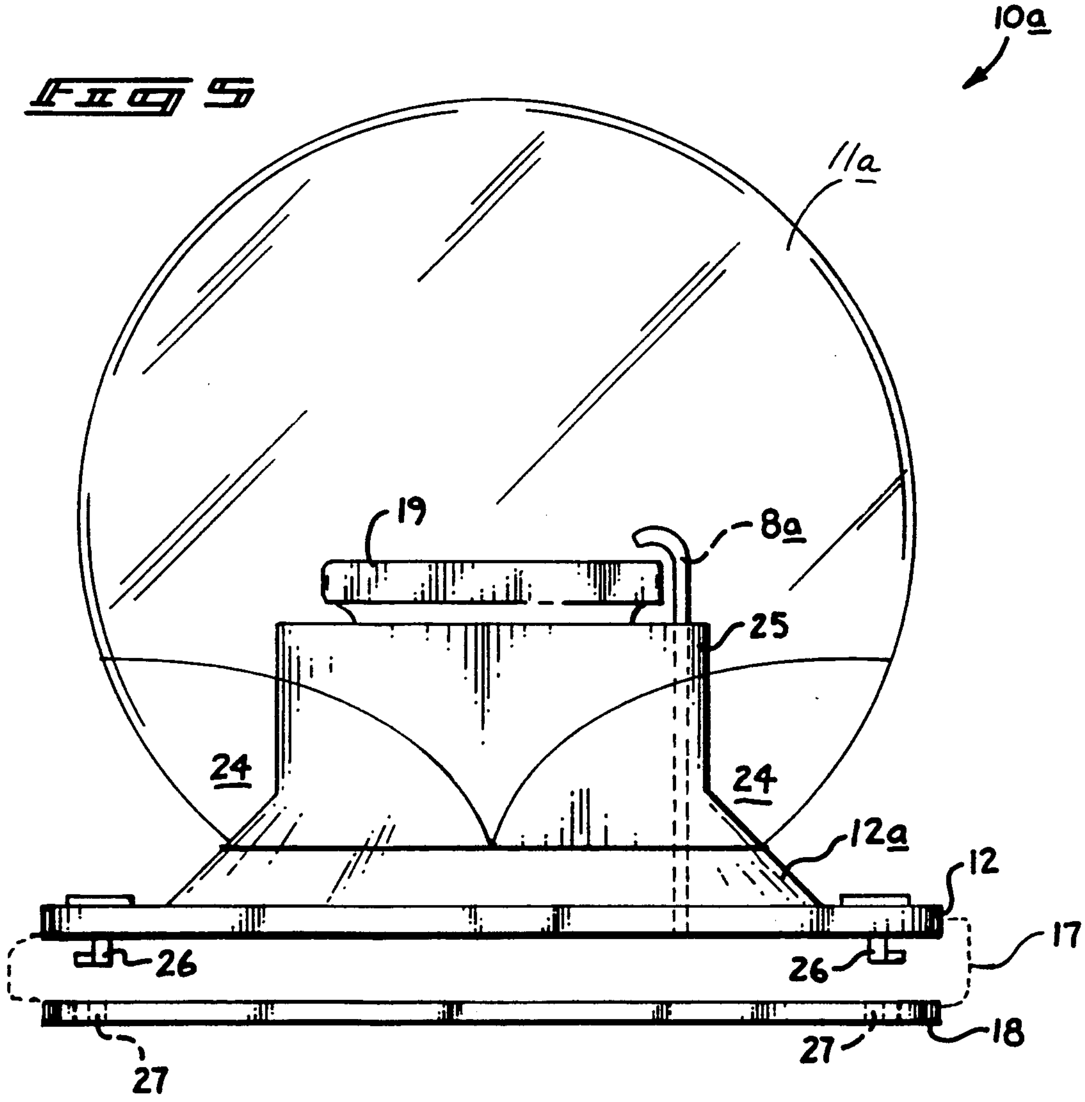
FIG. 5 is an orthographic side view of a modified dome structure utilized by the instant invention.
Figure 6:
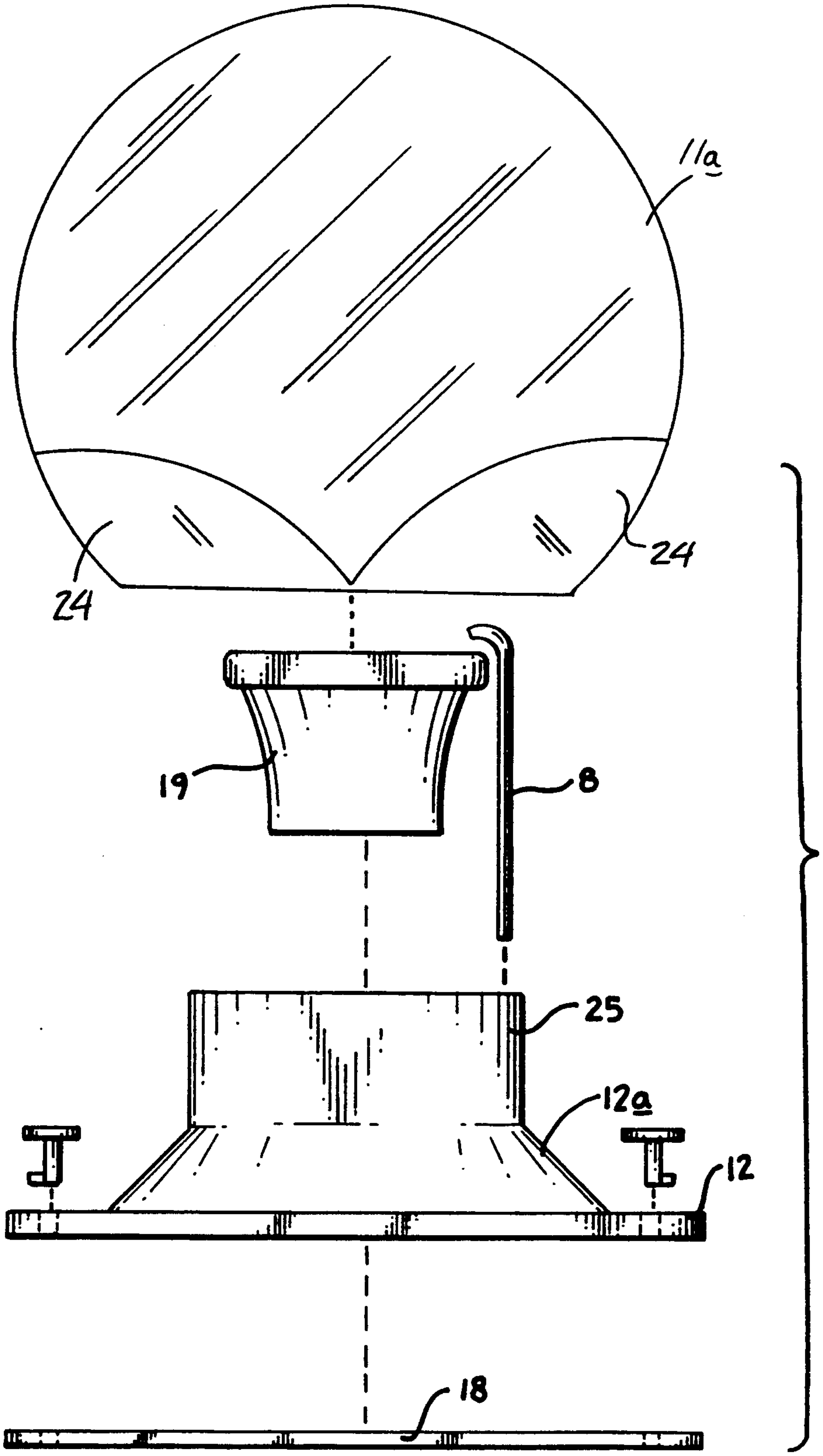
FIG. 6 is an orthographic exploded side view of the organization as set forth in FIG. 5.

The support base 18 and the filter member 17 each include respective first and second bores 21 and 22 in axial alignment with the securement threaded securement fasteners 20, wherein the dome base 12 includes third threaded bores 23 to fixedly receive the fasteners 20 and secure the assembly together. An alternative manner of securement is provided and illustrated in FIG. 5, wherein the modified fasteners 26 mounted to the dome base 12 project through the filter member 17 and are received within keyhole openings 27 within the support base 18 whereupon rotation of the modified fasteners 26 secures the assembly together. The organization 10*a*, as illustrated in FIG. 5) utilizes a pot support cylinder 25, but it is understood that the pot support organization as illustrated in FIG. 4 may be utilized. The modified dome 11*a* utilizes a plurality of spaced dome openings 24 positioned adjacent the lower terminal edge of the modified dome 11*a*, wherein the upper terminal edge of the plant pot 19 projects and is positioned above the openings 24, as well as the upper terminal end of the air conduit 8*a* to maintain a desired air supply within the dome 11*a* but permitting aquatic life to gain access interiorly of the dome in use.

Figure 7:
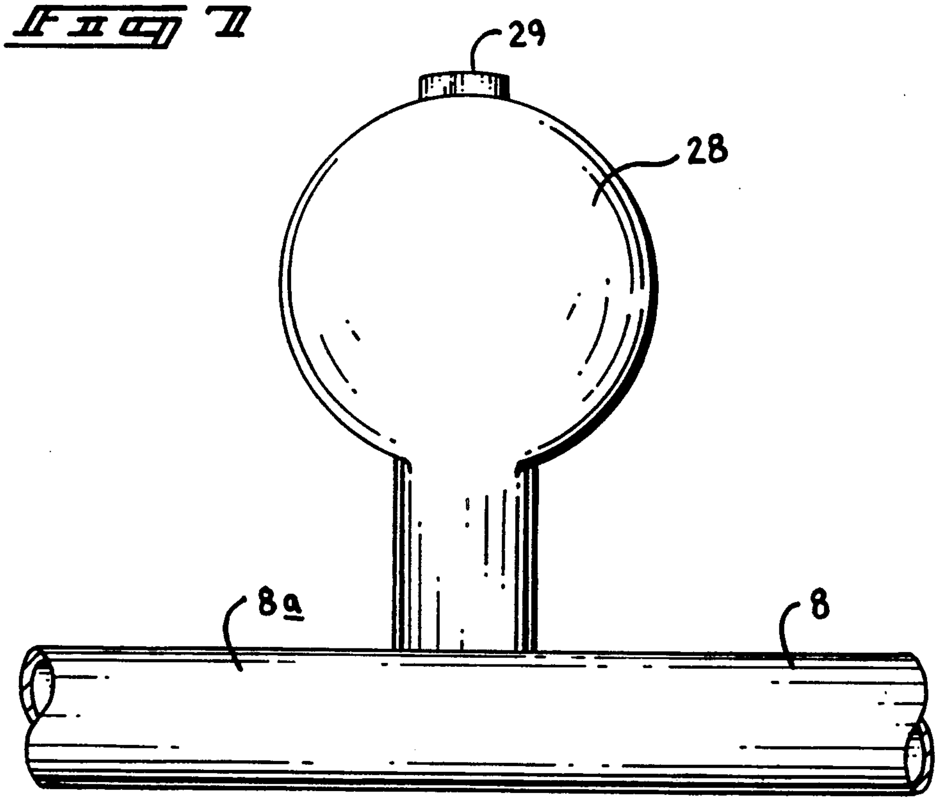
FIG. 7 is an orthographic side view of a water injection bulb utilized by the instant invention.
Figure 8:
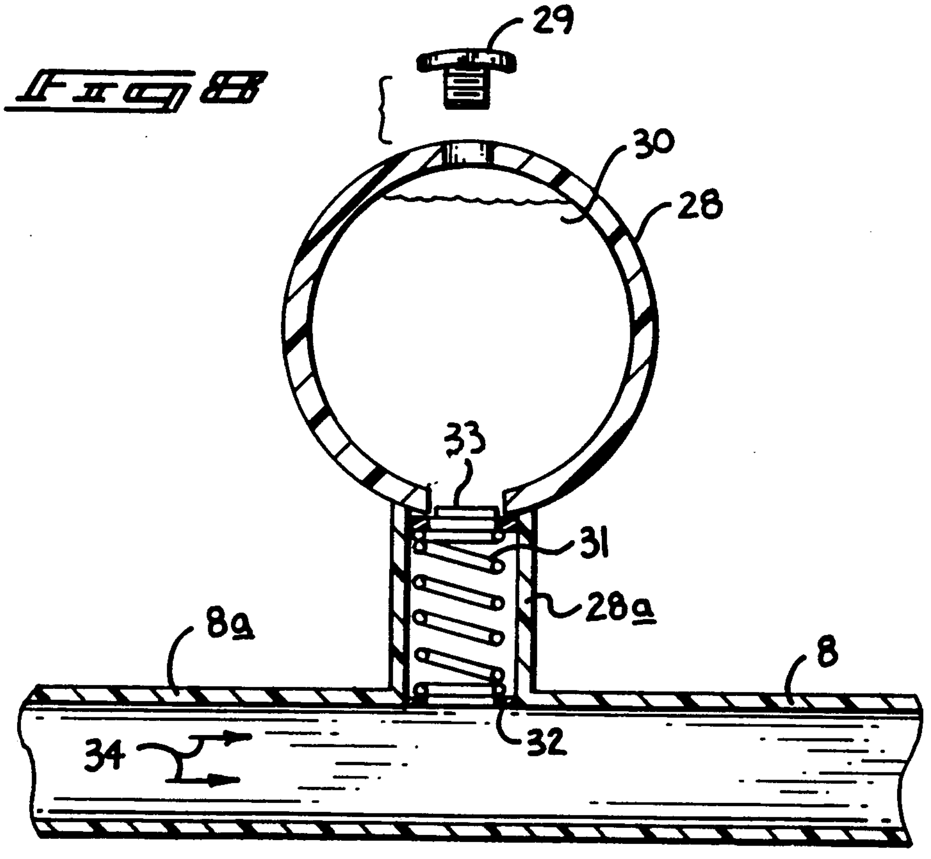
FIG. 8 is an orthographic cross-sectional illustration of the bulb structure as set forth in FIG. 7.

FIGS. 7 and 8 illustrate the use of a deformable bulb 28 to project fluid interiorly of the dome in use. The bulb 28 includes a removable fill plug 29 at an upper coaxial terminal end thereof to permit containment and positioning of fluid within the water filled cavity 30. A bulb conduit 28*a* is fixedly and cooperatively mounted coaxially with the deformable bulb 28 at a lower axial terminal end thereof, wherein the bulb conduit 28*a* includes a spring 31 coextensively biased and compressed within the bulb conduit 28*a*, including a ring-shaped lower spring support 32 mounting a lower terminal end of the spring 31 normally biased and positioned within a bulb entrance bore 33*a*. Upon manual collapsing of the bulb 28, fluid contained therewithin deflects the plug 33 from the bore 33*a* and projects that fluid into the air conduit 28*a* to direct a water and air mixture interiorly of the dome 11 or 11*a* in the direction of the air flow 34.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An aquarium-terrarium apparatus, comprising in combination, an aquarium enclosure, and the aquarium enclosure including air pump means for directing pressurized air mounted to the aquarium enclosure, and a fluid impermeable rigid dome mounted within the aquarium enclosure, and a dome base member for sealingly receiving a lower terminal end of the dome, and an air supply conduit, the air supply conduit projecting through the dome base interiorly of the dome, and pot holder means mounted on the dome base member for securing a plant pot therewithin, and wherein the pot holder means includes a plurality of pot holder legs fixedly and orthogonally mounted to a top surface of the dome base member, the pot holder legs defining a cylinder of revolution, and each pot holder leg including a branch leg extending radially interiorly and extending above each pot holder leg, and a support base extending between the pot holder legs for mounting the plant pot thereon, and at least one elastomeric band in surrounding relationship to the branch legs for engaging and securing the plant pot within the branch legs, and wherein the dome base member includes an upper arcuate resilient convex dome base to sealingly engage a lower terminal edge of the dome, and wherein the dome includes a plurality of through-extending openings directed through the dome contiguous with the lower terminal edge of the dome, and the air supply conduit extends above the through-extending apertures, and including a deformable bulb, the deformable bulb coaxially aligned and including a removable fill plug mounted to an upper axial end of the bulb, and a bulb conduit coaxially aligned and mounted to a lower axial end of the bulb, and the deformable bulb including a water filled cavity therewithin permitting replenishment through the removable fill plug, and the bulb conduit in fluid communication with the air supply conduit.

2. An apparatus as set forth in claim 1 including a ring-shaped lower spring support mounted at a lower terminal end of the bulb conduit adjacent the air supply conduit, and a spring captured between the ring-shaped lower spring support and the bulb, the bulb including a bulb entrance bore to permit fluid communication between the bulb conduit and the water filled cavity, and a valve plug mounted at an upper terminal end of the spring to normally bias the plug within the bulb entrance bore and to displace the bulb from the bulb entrance bore upon manual collapsing of the deformable bulb to permit projection of water from the water filled cavity into the air supply conduit.

3. An apparatus as set forth in claim 2 wherein the dome base member includes a plurality of spaced threaded bores, and the dome base member is mounted overlying a support base, the support base includes a plurality of securement fasteners, and the support plate includes a plurality of support base bores, and each securement fastener is directed through a respective support base bore and is received within a respective threaded bore of the dome base member.

* * * * *